United States Patent
Kunitomo (10) Patent No.: US 12,293,012 B2
(45) Date of Patent: May 6, 2025

(54) HEAD-MOUNTED DEVICE, CONTROL METHOD AND CONTROL PROGRAM FOR HEAD-MOUNTED DEVICE

(71) Applicant: SEIKO EPSON CORPORATION, Tokyo (JP)

(72) Inventor: Yuichi Kunitomo, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 563 days.

(21) Appl. No.: 17/708,321

(22) Filed: Mar. 30, 2022

(65) Prior Publication Data

US 2022/0326950 A1    Oct. 13, 2022

(30) Foreign Application Priority Data

Mar. 31, 2021 (JP) .................. 2021-059712

(51) Int. Cl.
  *G06F 3/01*   (2006.01)
  *G02B 27/01*  (2006.01)
  *G06F 3/16*   (2006.01)

(52) U.S. Cl.
  CPC ............ *G06F 3/011* (2013.01); *G02B 27/017* (2013.01); *G02B 2027/0178* (2013.01); *G06F 3/16* (2013.01)

(58) Field of Classification Search
  None
  See application file for complete search history.

(56) References Cited

U.S. PATENT DOCUMENTS

| | | | |
|---|---|---|---|
| 9,274,599 B1* | 3/2016 | D'Amico | G06F 21/32 |
| 9,977,483 B2 | 5/2018 | Ishikawa et al. | |
| 10,691,194 B2 | 6/2020 | Ishikawa et al. | |
| 2013/0249946 A1 | 9/2013 | Kimura | |
| 2015/0220152 A1* | 8/2015 | Tait | G06F 3/017 345/156 |
| 2016/0062474 A1* | 3/2016 | Tait | G06F 3/04883 345/173 |
| 2017/0045928 A1 | 2/2017 | Ishikawa et al. | |
| 2018/0239413 A1 | 8/2018 | Ishikawa et al. | |

FOREIGN PATENT DOCUMENTS

| | | |
|---|---|---|
| CN | 107703779 A | 2/2018 |
| JP | 2013-195867 A | 9/2013 |
| JP | 2015-156610 A | 8/2015 |

* cited by examiner

Primary Examiner — Lina Cordero
(74) Attorney, Agent, or Firm — Oliff PLC (57) ABSTRACT

A head-mounted device includes a mounted member that is mounted on a head of a user, a sensor unit, which is a detection device, that detects a posture of the mounted member, a control device that switches a control mode according to the posture detected in the sensor unit, and a video output device and an audio output device as output devices that perform output operations according to the control mode in the control device.

9 Claims, 11 Drawing Sheets

| ID | DIRECTION | NUMBER | COMMAND |
|---|---|---|---|
| 1 | +X AXIS | 1 | FAST FORWARD |
| 2 | -X AXIS | 1 | REWIND |
| 3 | +Z AXIS | 1 | PLAYBACK/STOP |
| 4 | +X AXIS | 2 | TURN BACKLIGHT ON/OFF |
| 5 | ... | ... | ... |

HEAD-MOUNTED DEVICE, CONTROL METHOD AND CONTROL PROGRAM FOR HEAD-MOUNTED DEVICE

The present application is based on, and claims priority from JP Application Serial Number 2021-059712, filed Mar. 31, 2021, the disclosure of which is hereby incorporated by reference herein in its entirety.

BACKGROUND

1. Technical Field

The present disclosure relates to a head-mounted device such as a head-mounted display, a control method and a control program for the head-mounted device.

2. Related Art

A head-mounted display is known that includes a detector that detects at least one of impact and displacement to the head-mounted display, and generates different commands according to the direction and number of impacts detected by the detector (see JP 2013-195867 A).

In the head-mounted display disclosed in JP 2013-195867 A, for example, when a wearer stops using the head-mounted display and places the head-mounted display on a desk in opposite posture (upside down) from that in which the head-mounted display was used, the impact caused by placing the head-mounted display on the desk may be recognized as an input from an unexpected direction to the head-mounted display, and a command (e.g., mute function) may be executed.

SUMMARY

A head-mounted device according to one aspect of the present disclosure includes a mounted member mounted on a head of a user, a detection device that detects a posture of the mounted member, an output device that outputs at least one of an image or sound, and a control device that switches a control mode of the output device and that receives an input signal related to the switching of the control mode, in which the control device determines whether the input signal is valid according to the posture of the mounted member.

DESCRIPTION OF EXEMPLARY EMBODIMENTS

First Embodiment

The structure and the like of an image display device as an example of a head-mounted device according to an aspect of the present disclosure will be described with reference to FIG. 1 and other figures.

Figure 1:
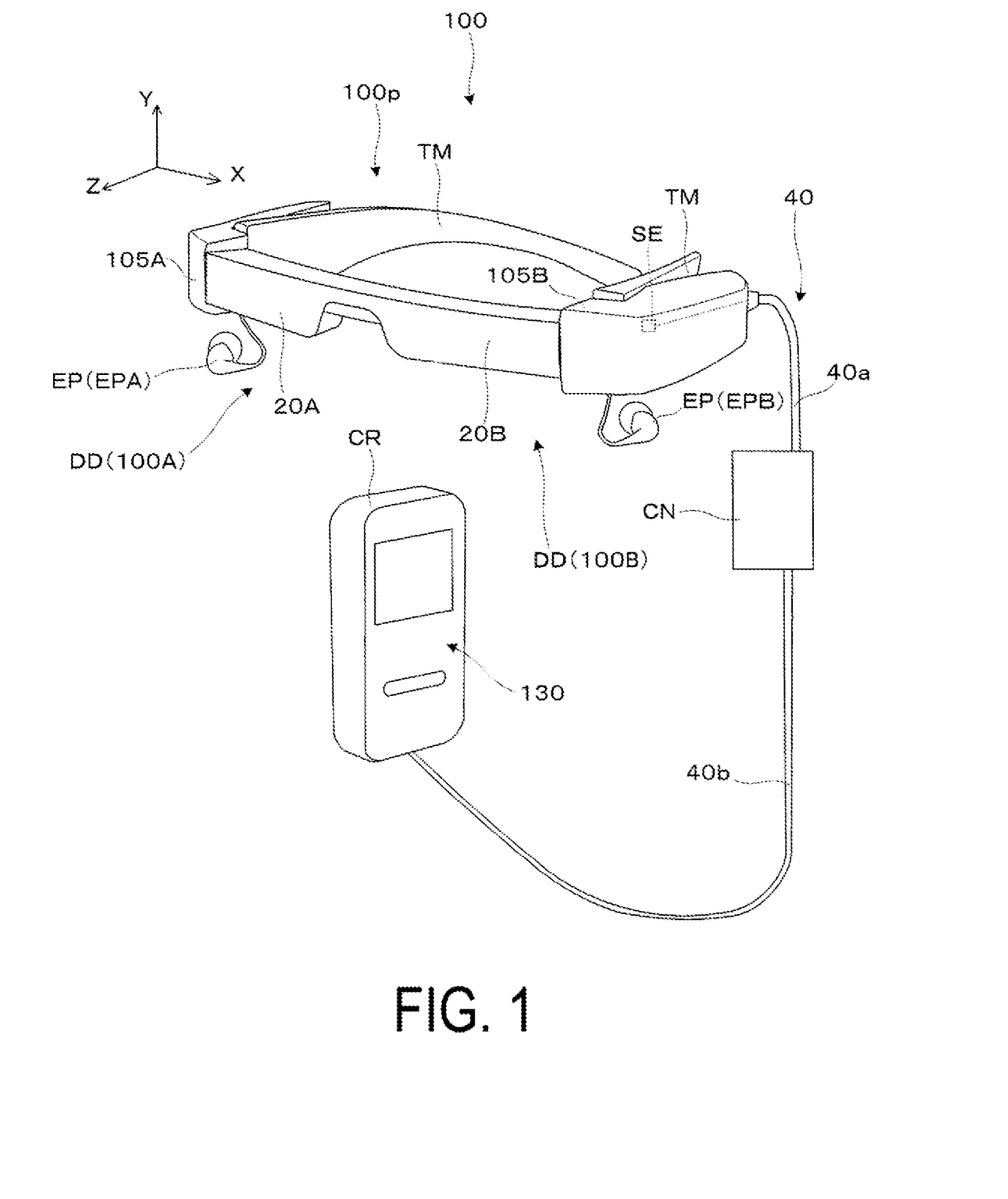
FIG. 1 is an external perspective view illustrating an example of a head-mounted device according to a first embodiment.
Figure 2:
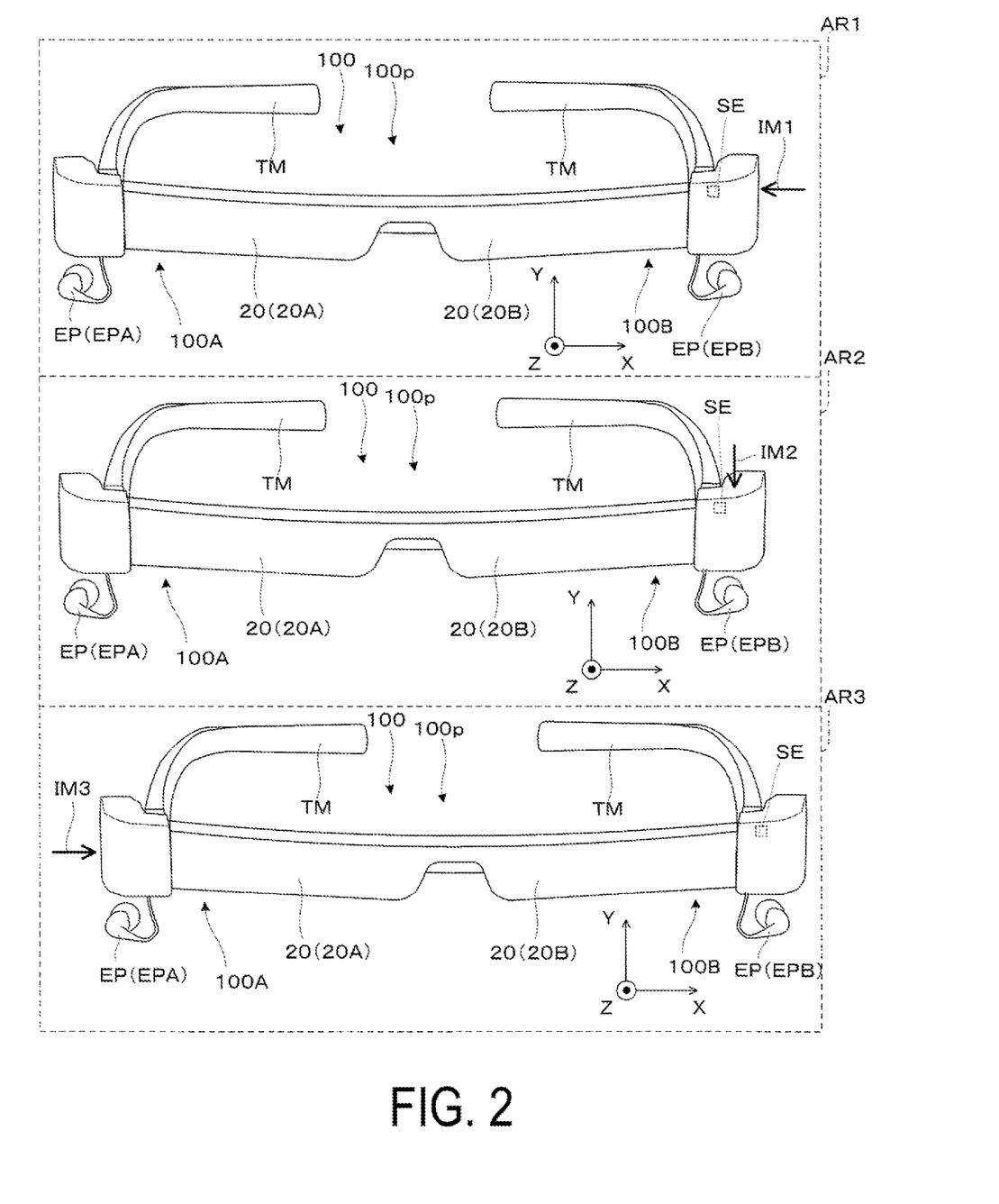
FIG. 2 is a diagram for describing an input operation to a mounted member of the head-mounted device.
Figure 3:
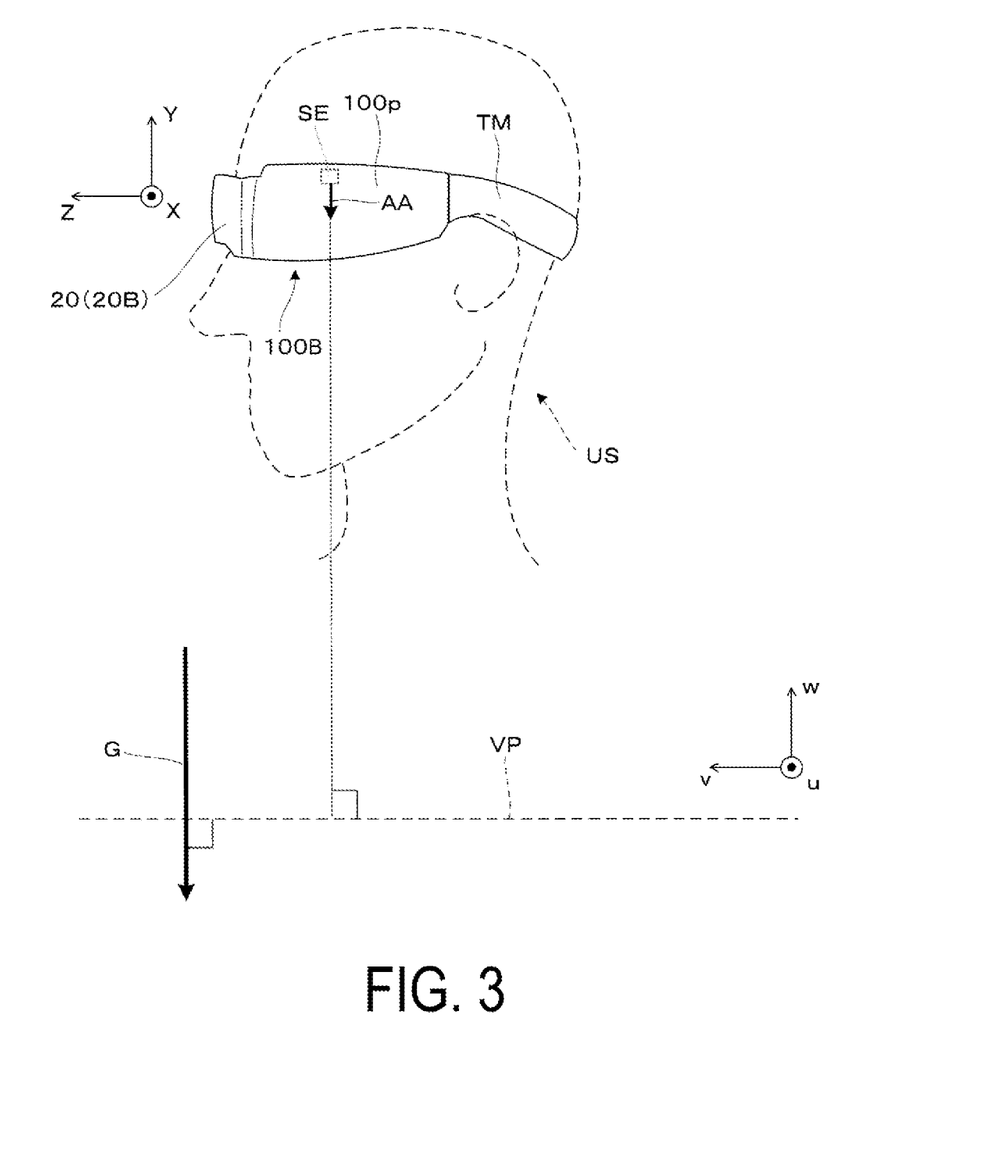
FIG. 3 is a side view illustrating a mounting state of the head-mounted device.

FIG. 1 is an external view illustrating an image display device 100, which is a head-mounted type, as an example of the head-mounted device. FIG. 2 illustrates a mounted member 100p that is a main body part of the image display device 100 for displaying images and that is mounted on a head of a user at the time of use, and also illustrates examples of input operations to the mounted member 100p. FIG. 3 is a conceptual side view illustrating an example of a state of the user, that is, an observer or wearer US wearing the image display device 100 mounted on the head.

As illustrated in FIG. 1 and other figures, the image display device 100 is a head-mounted display (HMD), which is an eyeglass type, and is a virtual image display device capable of causing the observer or wearer US (see FIG. 3) who wears the image display device 100 to recognize an image as a virtual image. In addition to allowing the observer or wearer US to recognize the image as the virtual image, the image display device 100 also allows the observer or the wearer US to see or observe an external image in a see-through manner. In FIG. 1 and other figures, X, Y, and Z are coordinate axes in an orthogonal coordinate system. A +X direction corresponds to a lateral direction in which the two eyes EY of the observer or wearer US wearing the image display device 100 are aligned, a +Y direction corresponds to an upward direction orthogonal to the lateral direction in which the two eyes EY of the wearer US are aligned, and a +Z direction corresponds to a forward or front direction of the wearer US. A ±Y direction is parallel to a vertical axis or a vertical direction.

The image display device 100 includes, as already described, in addition to the mounted member 100p, which is the main body part of the image display device 100 having a form of glasses, a control device CR and a cable (coupling part) 40 that couples the mounted member 100p and the control device CR.

From a functional point of view, the mounted member 100p includes a first display device 100A for the right eye and a second display device 100B for the left eye as video output devices DD. The first display device 100A includes, for example, an image forming body 105A and a light-guiding device 20A. Of these, the image forming body 105A includes, for example, a display element that forms image light with various panels and the like, a projection lens that projects the image light, and the like, all housed in a housing. The light-guiding device 20A is constituted of, for example, a prism member and the like, and is coupled to the image forming body 105A to guide the image light from the image forming body 105A to the front of the right eye as a virtual image. Similarly, the second display device 100B includes an image forming body 105B and a light-guiding device 20B, and guides the formed image light in front of the left eye as a virtual image. In the illustrated example, the light-guiding device 20A and the light-guiding device 20B are coupled at a central portion to form a single configuration, but the configuration is not limited thereto. It is also possible to have a configuration in which the light-guiding device 20A and the light-guiding device 20B are separated from each other. Further, in the configuration described above, the image light is guided in the lateral direction (±X direction), but it is also conceivable to have a configuration in which the image is guided in the longitudinal direction (for example, −Y direction).

The mounted member 100p also includes a first earphone (earphone for the right ear) EPA and a second earphone (earphone for the left ear) EPB as audio output devices EP.

In addition to the above, the mounted member 100p is provided with various components such as temples TM, which are ear hooking parts, as members for enabling the wearing of the mounted member 100p.

The control device CR is constituted of a CPU that executes various kinds of arithmetic processing, a storage device (storage unit), an input device, and the like. The control device CR also functions as a controller for receiving instructions for various operations from the observer by having a touch panel portion, a button portion, and the like as input devices. The control device CR transmits various signals, such as a video signal and an audio signal, to the mounted member 100p for projecting a desired image on the image display device 100 by executing various kinds of arithmetic processing. In other words, it can be said that the video output device DD and the audio output device EP in the mounted member 100p, which is the main body part, function as output devices that perform a display operation and an audio output operation according to instructions from the control device CR. Various types of devices can be used as the control device CR. In addition to using a dedicated control device, for example, it is also possible to use a smartphone as the control device CR by installing an application (application software) that enables various operations as described above. The control device CR is provided with an operation unit 130 as the input device in order to receive instructions for various operations by the wearer US (see FIG. 3).

The cable (coupling part) 40 is a member that couples the mounted member 100p and the control device CR with a coupling member CN therebetween. In the illustrated example, the cable (coupling part) 40 includes a first cable 40a that couples the mounted member 100p and the coupling member CN, and a second cable 40b that couples the coupling member CN and the control device CR. For example, as the second cable 40b, a USB Type-C connector or the like can be applied. The second cable 40b can be coupled to the control device CR, which can be selected from various devices, such as the smart phone as described above. Metal cables, optical fibers, or the like can be used for the cables of the first cable 40a and the second cable 40b.

In the above-described configuration, a sensor unit SE is provided inside the mounted member 100p. The sensor unit SE is constituted of various sensors, such as a three-axis acceleration sensor, and is capable of detecting the posture of the mounted member 100p, an impact applied to the mounted member 100p, or displacement of the mounted member 100p in three dimensions. Here, in particular, the sensor unit SE functions as a detection device for detecting the posture of the mounted member 100p as described above, so that the image display device 100 decides whether the input signal received as a signal related to the switching of the control mode is valid in order to control various operations such as a display operation based on the processing in the control device CR, according to the result of the posture detection of the mounted member 100p. Note that a detailed example of the configuration of the sensor unit SE will be described later with reference to a block diagram in FIG. 6.

Hereinafter, with reference to FIG. 2, one aspect of receiving the above-described input signal based on an impact to the mounted member 100p will be described. The image display device 100 generates different commands depending on the direction of the impact, for example, as exemplified by arrows IM1 to IM3 in regions AR1 to AR3 illustrated in FIG. 2. That is, the sensor unit SE detects the impacts from the −X direction as indicated by the arrow IM1 in the region AR1, from the −Y direction as indicated by the arrow IM2 in the region AR2, and from the +X direction as indicated by the arrow IM3 in the region AR3 as different impacts. In response to this, the control device CR treats each impact as a different command generated in each case, and switches the display and sound to the operation mode corresponding to the prescribed impact detection mode. In other words, the control device CR receives the impact as described above as an input signal for switching the control mode.

Figure 7:
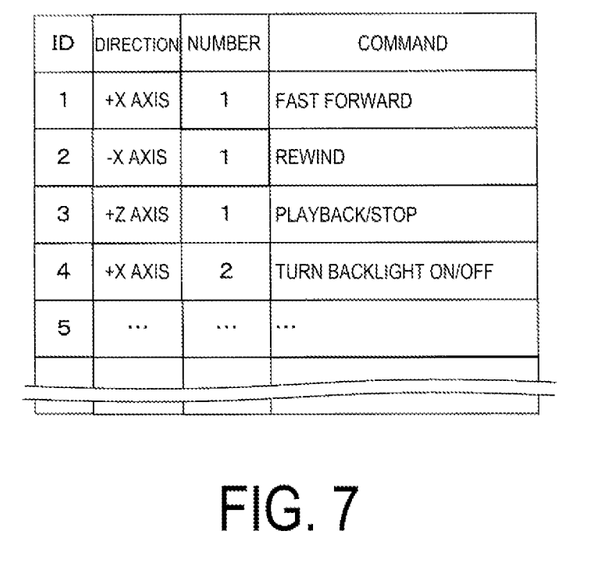
FIG. 7 is a data table illustrating an example of types of input signals.

Here, the impact from each direction described above corresponds to the case in which the wearer US (see FIG. 3) lightly taps any part of the mounted member 100p with a finger. That is, when the wearer US lightly taps the mounted member 100p with a fingertip or the like in a certain direction, the sensor unit SE detects the impact caused by the tapping of the mounted member 100p, the control device CR generates one of the various commands associated in advance based on the detection data from the sensor unit SE (see FIG. 7), and one of the various types of operational processing is executed accordingly. The wearer US can cause the control device CR to execute the operation (change the operation) intended by the wearer US by lightly tapping the mounted member 100p in a specific direction and number of times associated in advance. From another point of view, at least part of the operations corresponding to the operations by the operation unit 130 can be performed by lightly tapping any part of the mounted member 100p with a finger.

Further, in the present embodiment, as already mentioned, the sensor unit SE detects the posture of the mounted member 100p separately from the detection of the impact described above. When the control device CR receives the above-mentioned impact, that is, when the control device CR receives an input signal related to the switching of the control mode, the control device CR determines whether to switch the display mode and/or the audio output mode according to the detected posture.

Figure 5:
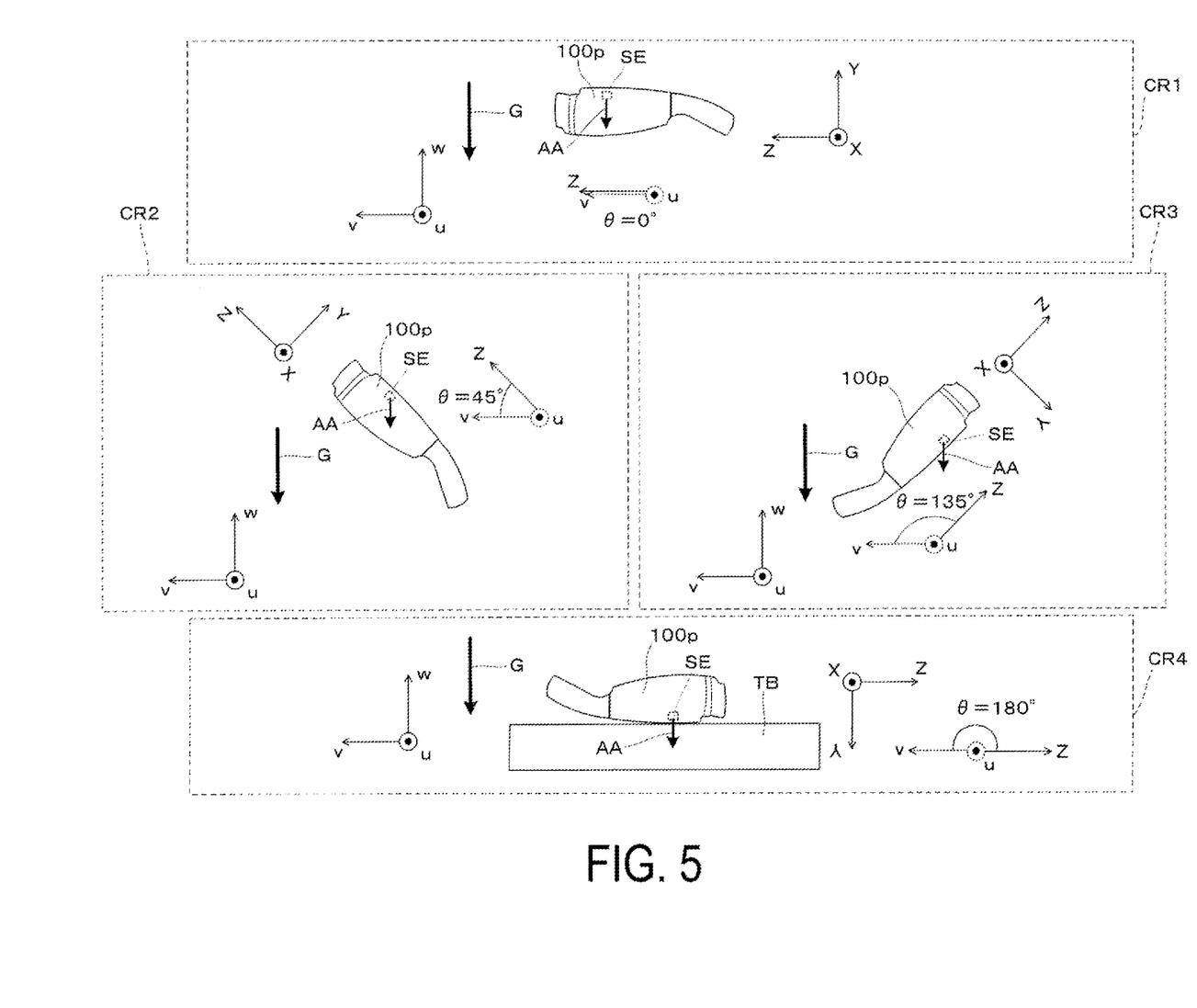
FIG. 5 is a conceptual diagram for describing a posture of the head-mounted device.

For example, there is a case in which the use of the image display device 100 is temporarily suspended and the mounted member 100p is placed on a desk in a state reversed from the state at the time of use (see, for example, region CR4 in FIG. 5). In this case, a situation may arise in which, at the moment when the mounted member 100p is placed on the desk, the sensor unit SE provided in the mounted member 100p detects impacts from a plurality of directions including the −Y direction, and when the impacts includes an impact in a direction in which the command has been set, the operation according to the setting is initiated. In order to avoid such a situation, in the present embodiment, the control device CR enables the reception of the input signal via the impact detection at the sensor unit SE as described above, and further determines whether the received input signal is valid according to the posture of the mounted member 100$p$ detected by the sensor unit SE as a detection device. Specifically, when it is found from the posture detection of the mounted member 100$p$ that the image display device 100 has been inverted from the state at the time of use, even when the sensor unit SE detects an impact, the control device CR treats the impact as invalid rather than valid, and does not switch to the operation corresponding to the impact.

Note that the sensor unit SE may be configured for sensing by using, for example, a three-axis acceleration sensor. In such a case, of the impact detection and the posture detection in the sensor unit SE described above, in the impact detection, an impact is detected as a large value (acceleration value) in a short period of time in a certain direction. On the other hand, in the posture detection, since the acceleration value such as the movement of a person's head is detected, the change in detected posture is slower, the acceleration value is smaller, and the detection time is longer than in the case of tapping with a fingertip, which is the above-mentioned impact detection. Due to the difference in their characteristics, the detection of impact operation and the detection of posture change can be separately extracted by analyzing the sensing results in the sensor unit SE. In other words, the control device CR can acquire information from the sensor unit SE on both the reception of the input signal based on the impact detection and the reception of the input signal based on the posture detection of the wearer US by appropriately performing the analysis processing of the sensing results (data).

Hereinafter, a specific example of posture detection will be described with reference to FIG. 3. Here, the state illustrated in FIG. 3 as an example is assumed to be a standard posture of the mounted member 100$p$ at the time of use. Specifically, first, the vertical direction, that is, the direction of gravity G, is perpendicular to a virtual plane VP, and directions parallel to the virtual plane VP and orthogonal to each other are a u direction and a v direction. In addition, a direction perpendicular to the u direction and the v direction and opposite to the direction of gravity G is a w direction.

Figure 4:
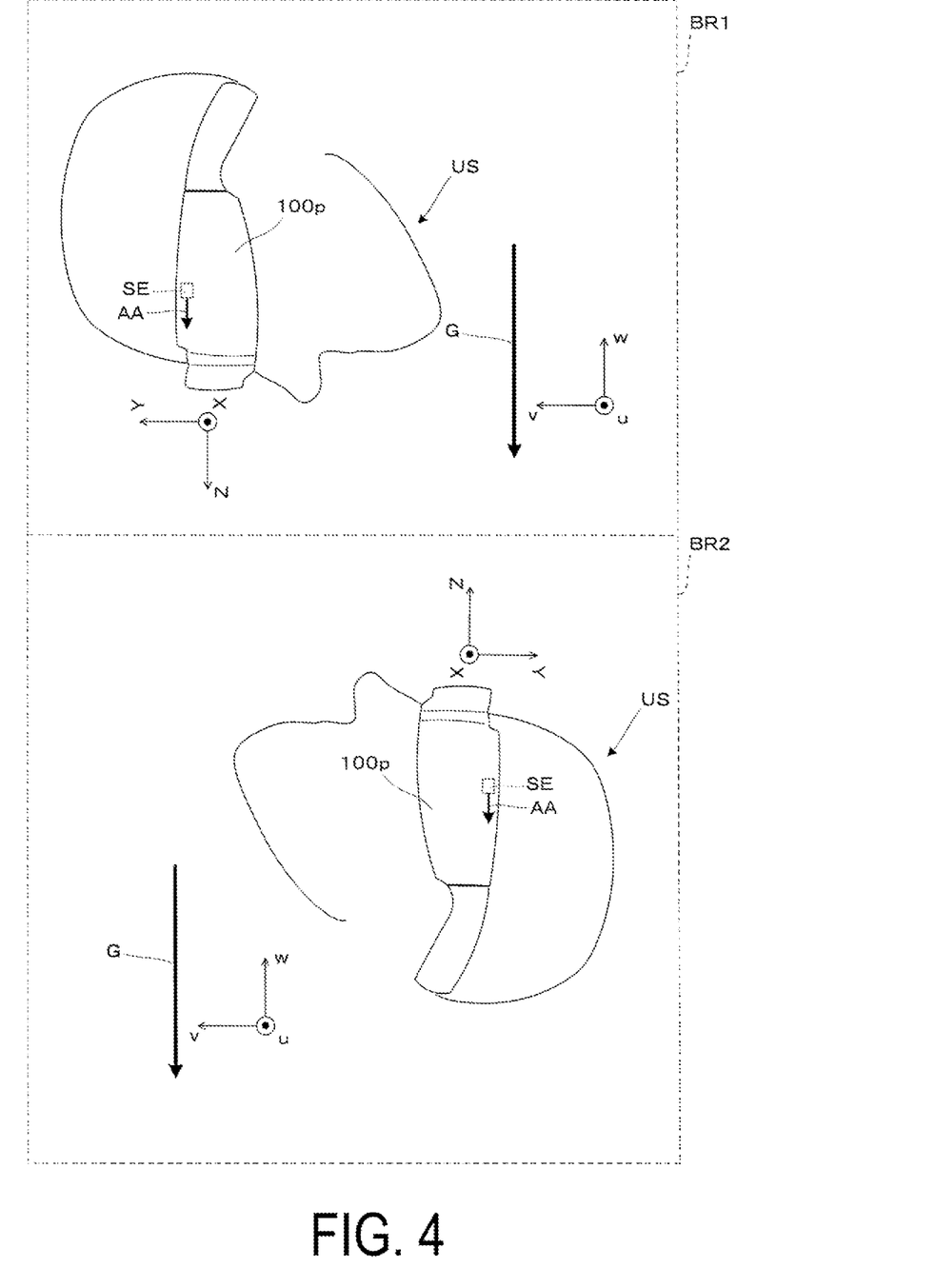
FIG. 4 is a diagram for describing a usage mode of the head-mounted device.

On the other hand, in the figure, the wearer US faces the front with wearing the mounted member 100$p$ and the head straight. Regarding the mounted member 100$p$, the XZ plane is horizontal, that is, the XZ plane and the virtual plane VP (uv plane) are parallel. In this state, the X direction is parallel to the u direction, and the Y direction is parallel to the v direction. The above-described state is the standard posture of the mounted member 100$p$ at the time of use. In contrast, in actual use, the wearer US is expected to change his or her posture (move his or her head) within a certain range. The assumed range of the posture change when the mounted member 100$p$ is used is considered from a state of facing directly downward in the region BR1 to a state of facing directly upward in the region BR2, as illustrated in FIG. 4 as specific examples. In the above-described configuration, when the posture of the mounted member 100$p$ changes, the relative relationship between the XYZ directions and the uvw directions changes. On the other hand, the sensor unit SE installed in the mounted member 100$p$ always detects the direction along the direction of gravity G indicated by the arrow AA, thereby detecting the posture of the mounted member 100$p$.

In the following, in order to simplify the description, the change in posture due to the wearer US is limited to the movement from upward to downward as illustrated in FIG. 4. In addition, the description will be omitted when the wearer US tilts his or her head to the left or right, and the like. In other words, in the figure, the change in posture when the u direction (X direction) is the rotation axis, of the axes parallel to the virtual plane VP, is targeted. In this case, the sensor unit SE as a detection device detects the posture when the axis along the direction in which the first display device 100A and the second display device 100B are aligned is the rotation axis.

In view of the characteristics of the change in posture in the example illustrated in FIG. 4, in the embodiment, it is determined whether the input signal is valid according to the rotation angle of the mounted member 100$p$ to the virtual plane VP. In other words, as illustrated in FIG. 3, when the mounted member 100$p$ is parallel (horizontal) to the virtual plane VP is set as a reference (rotation angle is 0°). Then, when the axis parallel to the virtual plane VP is the rotation axis, it is determined whether the mounted member 100$p$ is within the range defined by the states illustrated in FIG. 4. FIG. 5 illustrates the posture change of the mounted member 100$p$ and the associated change in the rotation angle $\theta$. For example, in the region CR1 corresponding to the state in FIG. 3 (reference state), the rotation angle $\theta$ is 0°. In the change of the posture targeted here, the rotation angle $\theta$ can be specified by the angle formed by the v direction and the Z direction, as illustrated in the figure, and whether the input signal is valid is determined by whether the rotation angle $\theta$ is within ±90°. In other words, when the rotation angle is within ±90°, the input signal is valid; otherwise, the input signal is invalid. Specifically, among the regions CR1 to CR4 illustrated in FIG. 5, when the rotation angle $\theta$=0° as illustrated in the region CR1, and when the rotation angle $\theta$=+45° as illustrated in the region CR2, corresponding to the state in which the mounted member 100$p$ faces slightly upward, the input signal based on the impact is treated as valid in the control device CR.

On the other hand, when the rotation angle $\theta$=+135° (i.e., the rotation angle $\theta$ exceeds +90°) as illustrated in the region CR3, and when the mounted member 100$p$ is inverted and placed on the desk TB, that is, when the rotation angle $\theta$=+180° as illustrated in the region CR4, the input signal based on the impact is treated as invalid in the control device CR. As described above, in the head-mounted device as the image display device 100 according to the embodiment, when the posture of the mounted member 100$p$ assuming non-use as illustrated in the region CR3 and the region CR4 is detected, the input signal based on the impact is not received, thereby avoiding or suppressing the occurrence of the unintended operation. In the above case, the control device CR receives the impact received by the mounted member 100$p$ as an input signal, and treats the input signal as a valid signal when the rotation angle $\theta$ is within a predetermined range. In the above case, when the rotation angle $\theta$ is outside the predetermined range, the control device CR treats the input signal as an invalid signal and maintains the control mode in a state before the impact is applied to the mounted member 100$p$.

Figure 6:
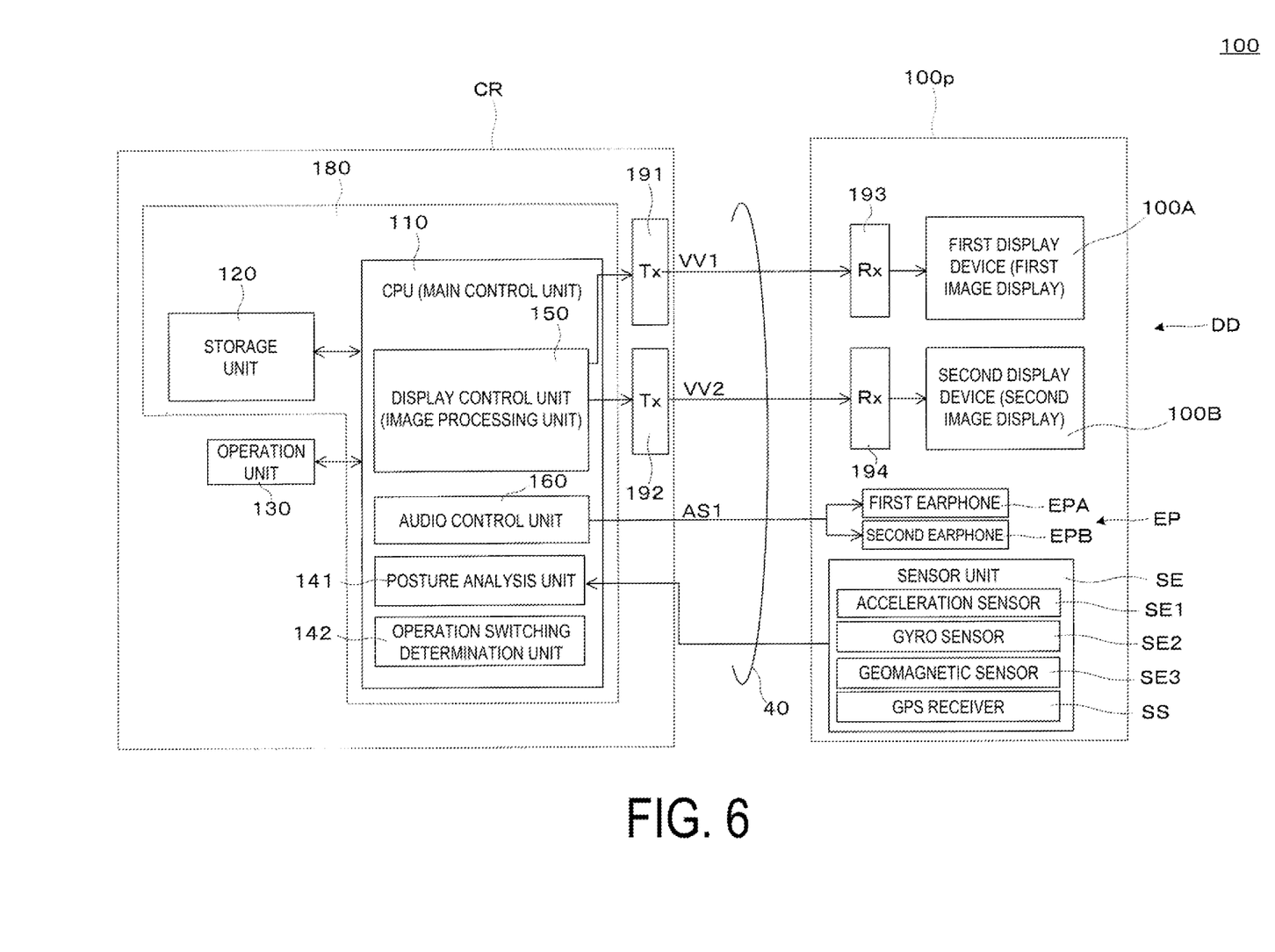
FIG. 6 is a block diagram for describing a configuration example of the head-mounted device.

Hereinafter, with reference to the block diagram of the image display device 100 illustrated as an example in FIG. 6, the components constituting the image display device 100 will be described from a functional standpoint.

As illustrated in the figure, in the image display device 100, the control device CR includes a CPU (main control unit) 110, a storage unit 120, the operation unit 130, and transmission units (Tx) 191 and 192. For example, the CPU (main control unit) 110 and the storage unit 120 may be integrated to form a single MCU 180.

The storage unit 120 is configured by a ROM, a RAM, and the like, and various computer programs and types of data are stored in the storage unit 120.

By reading and executing a computer program or data from the storage unit 120, the CPU 110 functions as a display control unit (image processing unit) 150 and an audio control unit 160. In addition, the CPU 110 functions as a posture analysis unit 141 and an operation switching determination unit 142. The posture analysis unit 141 performs, in order to detect the posture of the mounted member 100p and detect whether an impact corresponding to an input signal has been received, analysis processing based on information from the sensor unit SE provided in the mounted member 100p. The operation switching determination unit 142 determines whether to switch the operation based on the detection result of the posture by the posture analysis unit 141, that is, whether the input signal is valid.

As described above, the CPU 110 functions as the main control unit that controls the entire control of the image display device 100 by executing various kinds of arithmetic processing.

As already described, the operation unit 130 is an external input receiving device (input device) operated by the wearer US (see FIG. 3). For example, the operation unit 130 is constituted of various menu keys, a trackpad, and the like, and acquires a signal corresponding to an operation input by the observer or the user. However, as already described, in addition to the operation by the operation unit 130, various operations can also be performed by capturing an impact on the above-mentioned mounted member 100p as an input signal.

The transmission units 191 and 192 transmit various data VV1 and VV2, including video signals generated in the CPU 110, to the first and second display devices 100A and 100B, respectively, which constitute the mounted member 100p. In other words, the transmission units 191 and 192 function as transceivers for serial transmission between the control device CR and the first and second display devices 100A and 100B.

Next, in the image display device 100, as already mentioned, the mounted member 100p includes a pair of left and right first and second display devices 100A and 100B, which constitute the video output device DD, a pair of left and right first and second earphones EPA and EPB, which constitute the audio output device EP, and the sensor unit SE.

In addition to the above, as illustrated in the figure, reception units 193 and 194 that function as receivers for serial transmission between the control device CR and the first and second display devices 100A and 100B are provided. In other words, the first and second display devices 100A and 100B perform image formation based on the image data for the right eye and the image data for the left eye included in the various data VV1 and VV2 from the transmission units (Tx) 191 and 192 received by the reception units (Rx) 193 and 194, respectively.

The first and second earphones EPA and EPB output sound according to the audio signal AS1 from the audio control unit 160.

The sensor unit SE is configured by combining, for example, an acceleration sensor SE1, a gyro sensor (angular rate sensor) SE2, a geomagnetic sensor SE3, and a global positioning system (GPS) receiver SS, thereby functioning as a motion sensor that enables the impact detection and the position detection as described above. As for the sensor unit SE, it is not necessary to require all of the various sensors described above, and the sensor unit SE may be configured by some of these. For example, when a three-axis acceleration sensor is used as the acceleration sensor SE1 of the sensor unit SE, it is possible to detect an impact in any of the +X, −X, +Y, −Y, +Z, and −Z axis directions. Therefore, the posture analysis unit 141 can detect the number and direction of the impact detected by the sensor unit SE, based on the detection data from the sensor unit SE, and can generate specific command according to the detection result.

In addition, as the acceleration sensor SE1 of the sensor unit SE, by applying a three-axis acceleration sensor or the like to sense a value indicating the posture in the Y direction (direction to gravity), it is possible to detect the posture corresponding to the value of the rotation angle θ illustrated in FIG. 5. In this case, in the analysis processing in the posture analysis unit 141, for example, in FIGS. 4 and 5, the w direction corresponding to the direction of gravity G and the Y direction are compared. When the w direction and the Y direction are orthogonal to each other (when the rotation angle θ=±90°), the above-mentioned value is set to 0. With this set value as a boundary, when the above-mentioned value for the Y direction is positive (when the direction in which the w direction and the Y match), it is within a valid range, and when the above-mentioned value for the Y direction is negative (when the w direction is opposite to the Y direction), it is outside the valid range (within the invalid range). The above-mentioned value for the Y direction is the maximum value of 1 when the rotation angle θ=0°, and the minimum value of −1 when the rotation angle θ=180°.

The operation switching determination unit 142 determines whether the input signal is valid based on the impact, that is, the input signal assumed to have been received by the tap operation of the wearer US who is the user is valid, according to the analysis result in the posture analysis unit 141 performed as described above.

As described above, FIG. 7 illustrates an example of the types of commands for detected impact, depending on the direction and the number of times the impact received (i.e., the direction and the number of times of the operation assumed to be a tap operation by the wearer US). The operation switching determination unit 142 determines whether to perform these operations according to the posture of the mounted member 100p illustrated in FIG. 5. In the example illustrated in the figure, based on the detection data from the sensor unit SE, for example, when the CPU 110 detects a single impact in the +X axis direction, "fast forward" is executed in the playback of video and audio, and when the CPU 110 detects a single impact in the −X axis direction, "rewind" is executed. That is, the user can perform the desired operation by lightly tapping predetermined part of the mounted member 100p as illustrated in FIG. 2.

Hereinafter, an example of the operation in the image display device 100 having the above-mentioned configuration will be described with reference to the flowchart in FIG. 8. More specifically, an example will be described about the processing in the image display device 100 when an impact operation is detected, that is, when a tap operation by the wearer US (including an operation presumed to be a tap operation) is received, and when a posture change is received, that is, when a tap operation associated with the detection of the raised or lowered state of the head of the wearer US is received.

Here, when a change in posture is detected (when the value of the rotation angle θ changes largely), it is possible to immediately switch between enabling and disabling the reception of the input signal. However, depending on the situation, it may be desirable to not immediately switch between valid and invalid, but to switch after a predetermined time period has passed. A typical example is to invert (turn over) the mounted member 100p in the process of changing from a non-use state (a state in which the rotation angle is outside the predetermined range) to a use state (a state in which the rotation angle is within the predetermined range). When the input signal is treated as valid at the moment when the rotation angle is within the predetermined range, the momentum of inverting the mounted member 100p may be detected as an impact, that is, an input signal. In this case, there is a possibility that an operation may be started based on the input signal corresponding to the impact detected by inverting the mounted member 100p to return to the state of use, as well as stopping the mounted member 100p (i.e., inverting and stopping the mounted member 100p) (i.e., as a result, an operation may be started without the user's intention). Conversely, the same thing may occur when the rotation angle changes from within the predetermined range to outside the predetermined range. In order to avoid such a situation, an example may be considered in which enabling and disabling are not switched until a predetermined time has elapsed, and switching is performed after the predetermined time has elapsed. Here, the predetermined time is, for example, a short time (e.g., approximately one second) from the inversion of the mounted member 100p to the start of the tap operation for use.

Thus, in this example, when determining whether to enable reception of an impact generated by a user tapping or an equivalent impact (input signal associated therewith), it is considered whether the mounted member 100p has been maintained within or outside a predetermined range for a predetermined period of time or longer (for example, one second or longer). In the following, the above-mentioned enabling or disabling will be expressed as whether the tap reception state is valid or invalid.

Figure 8:
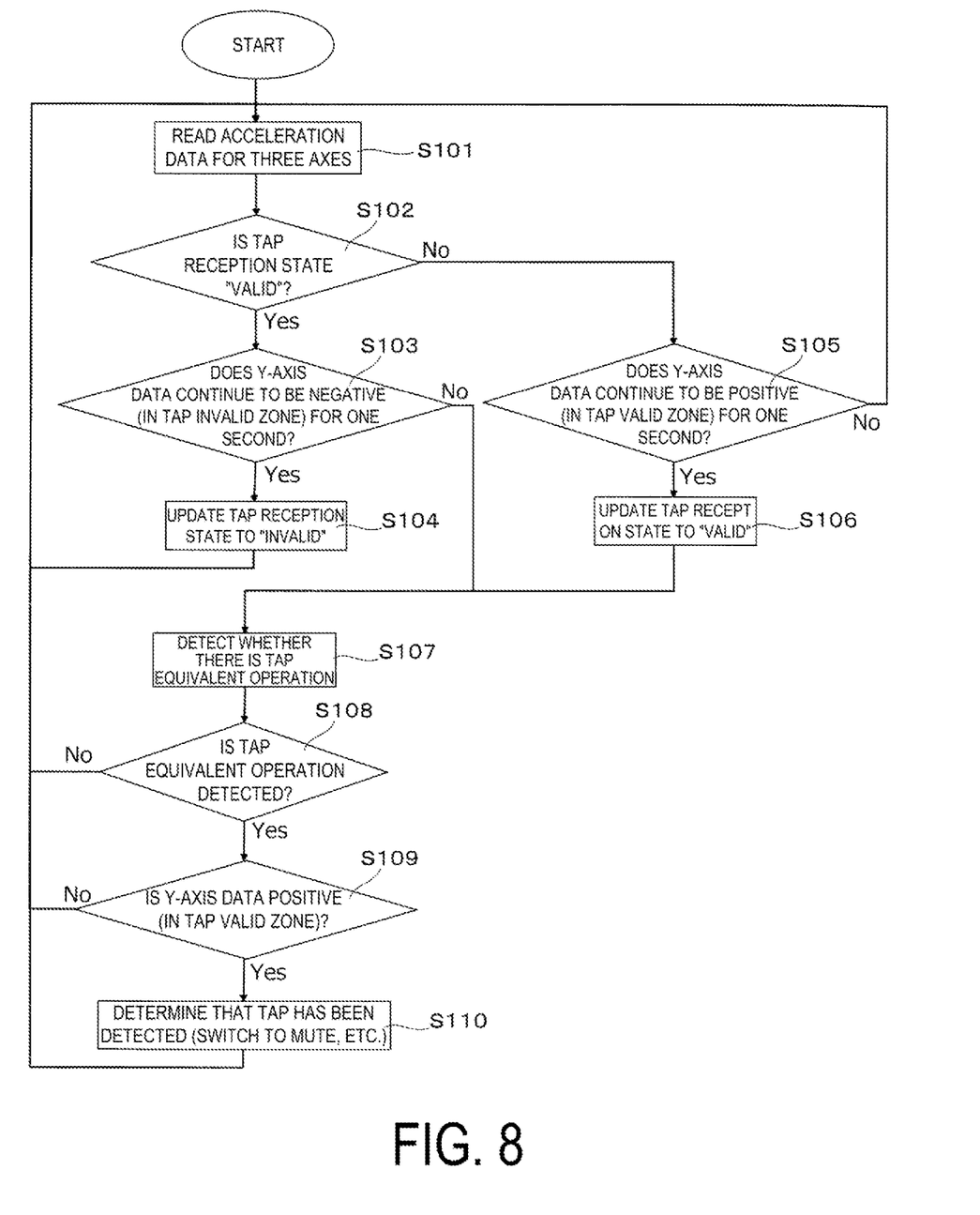
FIG. 8 is a flowchart for describing an example of the operation in the head-mounted device.

In the flowchart in FIG. 8, first, the CPU 110 of the image display device 100, as the posture analysis unit 141, reads various data from the sensor unit SE (step S101). Specifically, in step S101, for example, the CPU 110 reads the acceleration data for three axes from the acceleration sensor (three-axis acceleration sensor) SE1 included in the sensor unit SE. Subsequently, the CPU 110 checks whether the tap reception state is valid (step S102). In other words, when a tap operation by the wearer US or an equivalent operation is detected, the CPU 110 checks whether this operation is treated as a valid operation.

In step S102, when the tap reception state is valid (step S102: Yes), the CPU 110, as the operation switching determination unit 142, determines whether the Y-axis data among the acceleration data for three axes continues to be negative for one second, that is, whether the rotation angle θ is outside the range of ±90 degrees (in the tap invalid zone) for one second or more (step S103).

In step S103, when it is determined that the Y-axis data continues to be negative for one second (step S103: Yes), the CPU 110 updates the tap reception state to invalid, that is, switches the tap reception state to invalid, (step S104), and returns to the operation from step S101. On the other hand, in step S103, when it is not determined that the Y-axis data continues to be negative for one second (step S103: No), the CPU 110 maintains the tap reception state as valid.

In step S102, when the tap reception state is not valid (invalid) (step S102: No), the CPU 110, as the operation switching determination unit 142, determines whether the Y-axis data among the acceleration data for three axes continues to be positive for one second, that is, whether the rotation angle θ is within a range of ±90 degrees (in the tap valid zone) for one second or more (step S105).

In step S105, when it is determined that the Y-axis data does not continue to be positive for one second (step S105: No), the CPU 110 leaves the tap reception as invalid and returns to the operation from step S101. In step S105, when it is determined that the Y-axis data continues to be positive for one second (step S105: Yes), the CPU 110 updates the tap reception state to valid, that is, switches the tap reception state to valid (step S106).

As described above, only when the process of step S106 is passed, or when it is not determined in step S103 that the Y-axis data continues to be negative for one second (step S103: No), the CPU 110 will treat the tap reception state as valid. Conversely, when the CPU 110 treats the tap reception state as invalid, even when a tap operation or equivalent operation is detected, the CPU 110 does not perform the operation processing corresponding to these operation.

When step S106 is passed or when it is not determined in step S103 that the Y-axis data continues to be negative for one second (step S103: No), the CPU 110 detects whether there is an operation equivalent to a tap operation by the wearer US (step S107). In other words, the CPU 110 detects whether there is an input signal based on the impact, from the sensor unit SE. When it is determined from the detection in step S107 that there is an operation equivalent to a tap operation (step S108: Yes), the CPU 110 further checks whether the Y-axis data among the acceleration data for three axes at the present time is positive (step S109). In step S109, when the Y-axis data is determined to be positive, the CPU 110 determines that the tap operation has been detected. Then, the CPU 110, as the display control unit 150 or the audio control unit 160, performs processing according to the determination result (e.g., switching to mute) (step S110). After finishing the processing in step S110, the CPU 110 repeats the operation from step S101.

On the other hand, when no operation equivalent to the tap operation is detected in step S108 (step S108: No), or when the Y-axis data is determined not to be positive in step S109 (step S109: No), the CPU 110 determines that there is no input signal based on the impact from the sensor unit SE or that the input signal is invalid, and repeats the operation from step S101 without any special processing.

As described above, the image display device 100 as a head-mounted device according to the embodiment includes the mounted member 100p mounted on the head of the user who is the wearer US, the sensor unit SE that is a detection device that detects a posture of the mounted member 100p, the control device CR that switches the control mode according to the posture detected in the sensor unit SE, and the video output device DD and the audio output device EP as the output devices that perform output operations according to the control mode in the control device CR, in which the control device CR receives the input signal related to the switching of the control mode, and determines whether the received input signal is valid according to the posture of the mounted member 100p detected by the sensor unit SE. In this case, the image display device 100 makes it possible for the control device CR, which switches the control mode according to the posture detected in the sensor unit SE as the detection device, to receive an input signal related to the switching of the control mode. Then, the control device CR determines whether the input signal is valid according to the posture of the mounted member 100p. As a result, for example, even when an unexpected input signal is received in a situation where no output operation is assumed to be performed, for example, when the device is not in use, an appropriate response can be taken.

In the above-described example, a wired coupling between the mounted member 100p and the control device CR using the cable (coupling part) 40 is illustrated. However, it is not limited thereto, and a configuration is also possible in which signals can be exchanged between the mounted member 100p and the control device CR by, for example, any of various wireless communications (near field communication). Alternatively, it is also conceivable that a device equivalent to the control device CR including the operation unit 130 is built in the mounted member 100p. That is, as one aspect of the image display device 100, the control device CR may be wirelessly coupled, or the control device CR may be integrally provided inside the mounted member 100p.

Second Embodiment

A head-mounted device according to a second embodiment will be described below with reference to FIG. 9. The image display device as an example of a head-mounted device according to the embodiment is a partially modified version of the image display device of the first embodiment, and is similar in other configurations except for the detection of the input signal. For this reason, in the overall configuration, detailed illustrations and explanations are omitted for the components with the same reference signs as in other figures, and the matters explained with reference to other figures are used as necessary.

Figure 9:
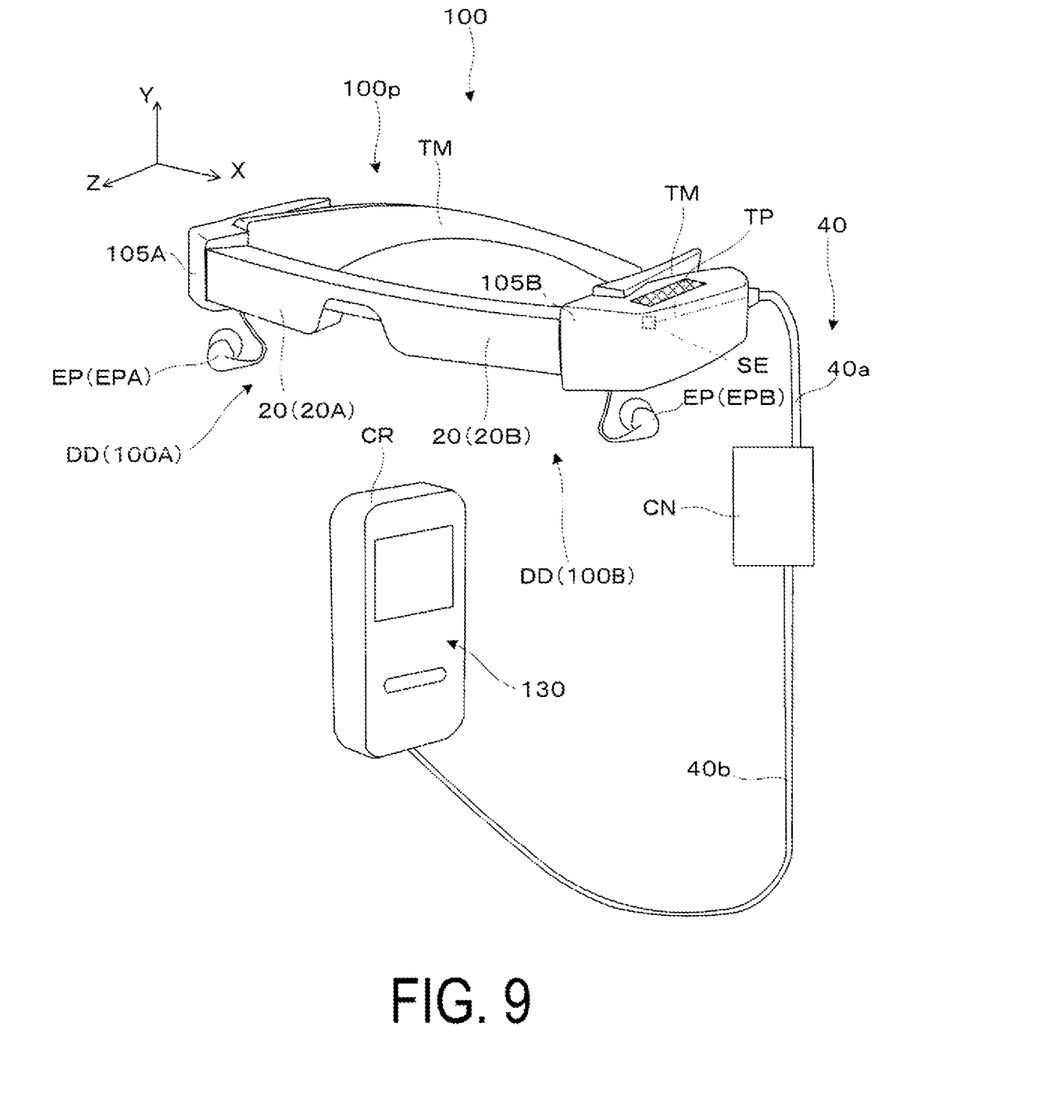
FIG. 9 is an external perspective view illustrating an example of a head-mounted device according to a second embodiment.

FIG. 9 is an external view illustrating the image display device 100 according to the embodiment, and corresponds to FIG. 1. In the first embodiment, as illustrated in FIG. 1, in addition to functioning as a detection device to detect the posture of the mounted member 100p, the sensor unit SE receives an impact such as a tap operation by the wearer US as an input signal. In contrast, in an example illustrated in FIG. 9, a touch panel sensor TP is provided in one region on the top surface of the mounted member 100p, as illustrated by hatching. When the wearer performs any of various operations such as tapping and swiping on the surface of the touch panel sensor TP, a signal corresponding to the above-mentioned input signal are generated. The configuration differs from that of the first embodiment in the above points.

In other words, in the above-described configuration, the touch panel sensor TP functions in place of the sensor unit SE in the first embodiment, which detects the impact associated with the operation of lightly tapping the mounted member 100p in a certain direction, and also functions as part of the operation by the operation unit 130.

Also in the embodiment, the sensor unit SE detects whether the rotation angle θ is within the range of ±90° for the posture of the mounted member 100p. Based on this, it is decided whether the input signal received by the touch panel sensor TP, that is, the input signal for switching the control mode, is valid. As a result, even when an unexpected input signal is received in a situation where no output is expected, for example, when the device is not in use, an appropriate response can be taken.

Third Embodiment

A head-mounted device according to a third embodiment will be described below with reference to FIG. 10 and the like. The head-mounted device according to the embodiment differs from the image display devices of the first and second embodiments in that the head-mounted device according to the embodiment is an eyeglass shaped headphones (audio output device) and does not have components that perform display operations.

Figure 10:
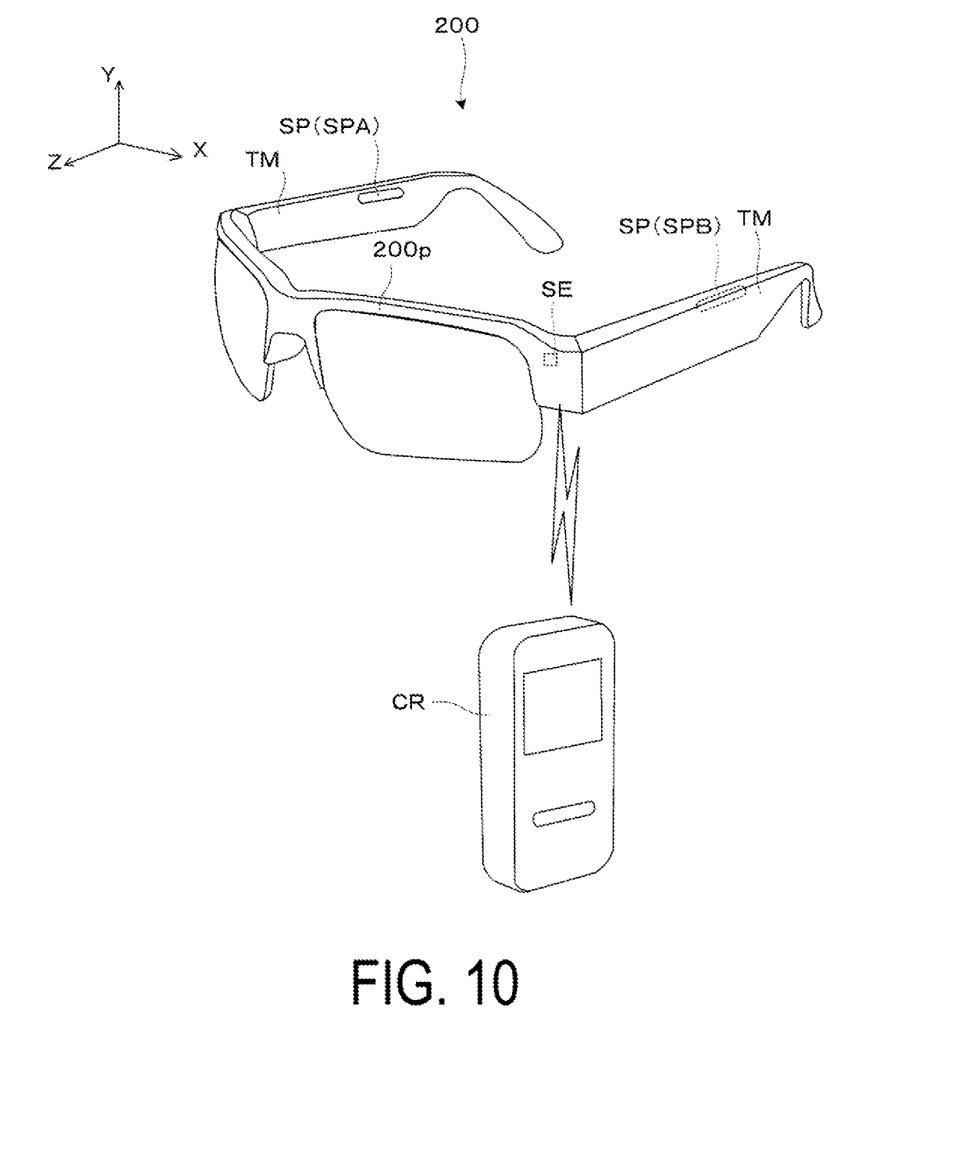
FIG. 10 is an external perspective view illustrating an example of a head-mounted device according to a third embodiment.
Figure 11:
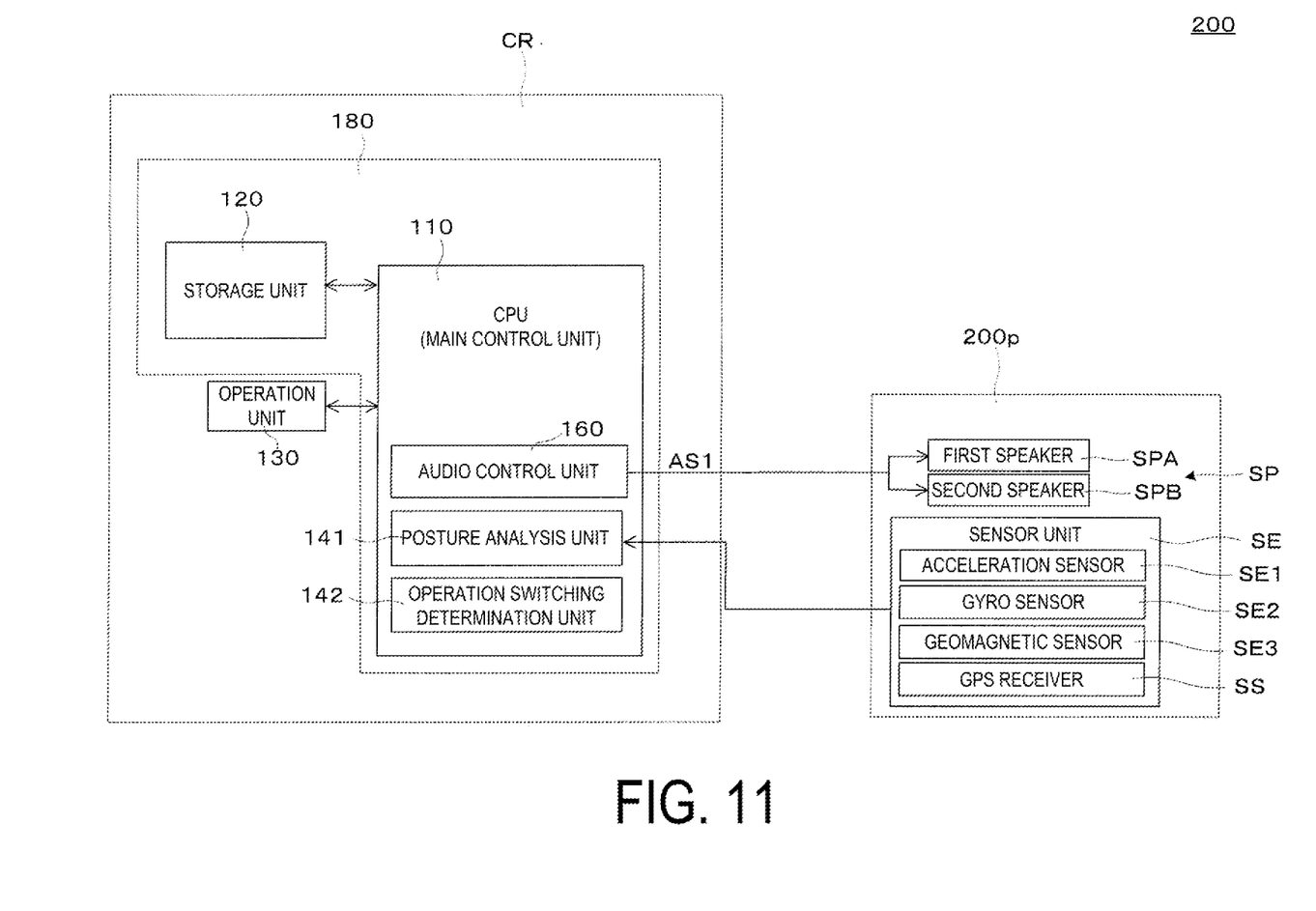
FIG. 11 is a block diagram for describing a configuration example of the head-mounted device.

FIG. 10 is an external view illustrating an eyeglass shaped headphones 200 as an example of a head-mounted device according to the embodiment, and corresponds to FIG. 1 and the like. FIG. 11 is a block diagram for describing a configuration example of the eyeglass shaped headphones 200, and corresponds to FIG. 6.

In an example illustrated in FIG. 10, the eyeglass shaped headphones 200 is configured in the shape of eyeglasses, such as sunglasses, for example. A pair of left and right speakers SP (first speaker SPA and second speaker SPB) are provided as audio output devices in parts of the temples TM, that are disposed near the ears of the wearer when in use. For the first speaker SPA and the second speaker SPB, any of various types of small speakers can be applied, for example, speakers that transmit sound by bone conduction can be used.

The eyeglass shaped headphones 200 is constituted of a mounted member 200p, which is a main body part as eyeglass shaped member such as sunglasses, and the control device CR. Of these, the mounted member 200p is provided with the sensor unit SE, similar to that provided with the head-mounted device illustrated in the first embodiment, so that the posture of the mounted member 200p can be detected. In addition, as already mentioned, the speakers (audio output device) SP are provided in the temples TM of the mounted member 200p.

In the example illustrated in the figure, signals can be exchanged between the mounted member 200p and the control device CR by, for example, any of various wireless communications (near field communication). Accordingly, as illustrated in FIG. 11, information of the sensing result in the sensor unit SE is transmitted to the posture analysis unit 141 of the control device CR, and various command signals from the control device CR are transmitted to the mounted member 200p side.

Also in the embodiment, the sensor unit SE detects whether the posture of the mounted member 200p is, for example, within the range of ±90° of the rotation angle θ. Based on this, it is determined whether the input signal for the switching of the control mode is valid. As a result, even when an unexpected input signal is received in a situation where no output is expected, for example, when the device is not in use, an appropriate response can be taken.

In the embodiment, for the reception of the above-mentioned input signals, in addition to the configuration using the impact detection in the sensor unit SE as illustrated in the first embodiment, that is, the configuration for detecting the tap operation on the mounted member 200p, the configuration using the touch panel sensor TP (see FIG. 9) as illustrated in the second embodiment may be used. Alternatively, it is also conceivable that a device equivalent to the control device CR including the operation unit 130 is built in the mounted member 200p.

Modified Examples and Others

The present disclosure is described according to the above-described embodiments, but the present disclosure is not limited to the above-described embodiments. The present disclosure may be carried out in various modes without departing from the gist of the present disclosure, and, for example, the following modifications may be carried out.

In the above, for example, the image display device 100 according to the first embodiment has a see-through configuration in which an image as a virtual image is recognized and an external image is seen or observed. However, the image display device 100 according to the first embodiment may have a configuration in which the external image is not visible (so-called closed type).

In the above, the detection device that detects the posture of the mounted members 100p or 200p is considered to be the sensor unit SE. However, it is also possible to consider the detection device including the posture analysis unit 141 in addition to the sensor unit SE. In addition, it is also conceivable to have a configuration in which an analysis function equivalent to that of the posture analysis unit 141 is provided on the sensor unit SE side and the analysis result is transmitted to the mounted member 100p or 200p side.

In the above description, the range (effective range) of the rotation angle $\theta$ is set to $\pm 90°$. However, the range is not limited thereto, and can be set from various ranges depending on the usage mode of the device. For example, the wearer US may be able to set the range of the rotation angle $\theta$ at the time of use. Further, although the description is omitted above, it is also possible to set the above effective range taking in consideration of the case in which the user, that is, the wearer US, tilts his or her head. In this case, for example, it is conceivable to use the value in the Y direction described above.

In the above, the image display device 100 is for both eyes, but for the image display device 100, one of the parts for the right eye and the left eye may be omitted. In this case, a one-eye head-mounted display is obtained.

In addition, in the above, in the first and second embodiments, the configuration of the head-mounted device including both the video output device DD and the audio output device EP is illustrated. On the other hand, in the third embodiment, the configuration of the head-mounted device including only the speaker SP as the audio output device is illustrated. In addition to these, for example, in a head-mounted device that includes only a video output device (e.g., the video output device DD exemplified in the first embodiment), it is considered that a configuration as in the present application may be applied, that is, whether the input is valid may be determined according to the tilt of the posture.

A head-mounted device according to a specific aspect includes a mounted member mounted on a head of a user, a detection device configured to detect a posture of the mounted member, a control device configured to switch a control mode according to the posture detected in the detection device, and an output device configured to perform an output operation according to the control mode in the control device, in which the control device receives an input signal related to the switching of the control mode, and determines whether the received input signal is valid according to the posture of the mounted member detected by the detection device.

In the above-mentioned head-mounted device, the control device, which switches the control mode according to the posture detected in the detection device, can receive the input signal related to the switching of the control mode. Then, it is determined whether the input signal is valid according to the posture of the mounted member. As a result, even when an unexpected signal is received in a situation where the output operation is not expected, for example, when the device is not in use, an appropriate response can be taken.

In a specific aspect, when a rotation axis is an axis parallel to the virtual plane orthogonal to the vertical direction, the control device determines whether the input signal is valid according to a rotation angle of the mounted member to the virtual plane. In this case, an angle range based on the vertical direction can be defined as a criterion for determination based on detection of the posture.

In a specific aspect, when an impact received by the mounted member is received as an input signal and the rotation angle is within a predetermined range, the control device treats the input signal as a valid signal. In this case, while using the impact received by the mounted member as the input signal, that is, a trigger for switching the control mode, it is possible to decide whether to adopt this based on the range of the rotation angle.

In a specific aspect, when the rotation angle is outside the predetermined range, the control device treats the input signal as an invalid signal, and maintains the control mode in a state before being impacted by the mounted member. In this case, by treating the signal as invalid according to the conditions, it is possible to avoid or suppress the occurrence of an unintended operation.

In a specific aspect, when the detection device detects that the rotation angle changes from an angle outside the predetermined range to an angle within the predetermined range, the control device disables the reception of the input signal before a predetermined time after the detection, and enables the reception of the input signal after the predetermined time. In this case, for example, when the mounted member is inverted (turned over) in the process of changing from a non-use state to a use state, the momentum of the inversion can be detected to prevent an unintended operation from being initiated.

In a specific aspect, the detection device includes an acceleration sensor, and the control device treats an impact from a specific direction detected in the acceleration sensor as an input signal. In this case, it is possible to receive an input signal using the impact detected by the acceleration sensor.

In a specific aspect, the output device includes a display device configured to display an image. In this case, it is possible to appropriately switch the control mode for displaying the image.

In a specific aspect, the display device includes a first display device and a second display device, and the detection device performs posture detection with a rotation axis that is an axis along a direction in which the first display device and the second display device are aligned. In this case, the image is displayed to the left and right eyes of the user, and the direction in which the eyes are aligned is used as the reference for rotation, and the detection device determines whether the input signal is valid according to the degree of rotation.

In a specific aspect, the output device includes an audio output device. In this case, it is possible to appropriately switch the control mode related to sound.

A method for controlling the head-mounted device in a specific aspect including detecting a posture of a mounted member mounted on a head of a user, switching a control mode according to the posture of the mounted member detected, and performing an output operation according to the control mode includes receiving an input signal related to the switching of the control mode and determining whether reception of the input signal is valid according to the posture of the mounted member detected.

A non-transitory computer-readable storage medium storing a program for a head-mounted device in a specific aspect including being configured to detect a posture of a mounted member mounted on a head of a user, being configured to switch a control mode according to the posture of the mounted member detected, and being configured to perform an output operation according to the control mode includes being configured to receive an input signal related to the switching of the control mode and being configured to determine whether reception of the input signal is valid according to the posture of the mounted member detected.

What is claimed is:

1. A head-mounted device comprising:
a mounted member mounted on a head of a user;
a detection device that detects a posture of the mounted member;
an output device that outputs at least one of an image or sound; and
a control device that switches a control mode of the output device and that receives an input signal related to the switching of the control mode, wherein
the control device determines whether the input signal is valid according to the posture of the mounted member detected by the detection device,
the output device includes a first display device and a second display device,
the detection device detects the posture of the mounted member with a rotation axis that is an axis along a direction in which the first display device and the second display device are aligned, and
the control device determines whether the input signal is valid according to a rotation angle formed by a virtual plane orthogonal to a vertical direction and the direction in which the first display device and the second display device are aligned, and a direction orthogonal to the direction in which the first display device and the second display device are aligned in the mounted member.

2. The head-mounted device according to claim 1, wherein the control device treats an impact received by the mounted member as the input signal when the rotation angle is within a predetermined range.

3. The head-mounted device according to claim 2, wherein the control device disables reception of the input signal when the rotation angle is outside the predetermined range.

4. The head-mounted device according to claim 3, wherein the control device receives the input signal after a predetermined time elapses when the rotation angle changes from an angle outside the predetermined range to an angle within the predetermined range.

5. The head-mounted device according to claim 1 further comprising:
an acceleration sensor that detects an impact from a specific direction, wherein
the control device treats the impact as the input signal.

6. The head-mounted device according to claim 1, wherein the output device is a display device configured to display the image.

7. The head-mounted device according to claim 1, wherein the output device is an audio output device configured to output the sound.

8. A method for controlling a head-mounted device having an output device, including:
detecting a posture of a mounted member mounted on a head of a user;
switching a control mode according to the posture of the mounted member detected, and
performing an output operation of the output device according to the control mode, including:
receiving an input signal related to the switching of the control mode; and
determining whether reception of the input signal is valid according to the posture of the mounted member detected,
wherein
the output device includes a first display device and a second display device,
the detecting includes detecting the posture of the mounted member with a rotation axis that is an axis along a direction in which the first display device and the second display device are aligned, and
the determining includes determining whether the input signal is valid according to a rotation angle formed by a virtual plane orthogonal to a vertical direction and the direction in which the first display device and the second display device are aligned, and a direction orthogonal to the direction in which the first display device and the second display device are aligned in the mounted member.

9. A non-transitory computer-readable storage medium storing a program for controlling a head-mounted device having an output device, the program being configured to perform:
detecting a posture of a mounted member mounted on a head of a user;
switching a control mode according to the posture of the mounted member detected; and
performing an output operation of the output device according to the control mode, including:
receiving an input signal related to the switching of the control mode; and
determining whether reception of the input signal is valid according to the posture of the mounted member detected,
wherein
the output device includes a first display device and a second display device,
the detecting includes detecting the posture of the mounted member with a rotation axis that is an axis along a direction in which the first display device and the second display device are aligned, and
the determining includes determining whether the input signal is valid according to a rotation angle formed by a virtual plane orthogonal to a vertical direction and the direction in which the first display device and the second display device are aligned, and a direction orthogonal to the direction in which the first display device and the second display device are aligned in the mounted member.

* * * * *